Figure 1:
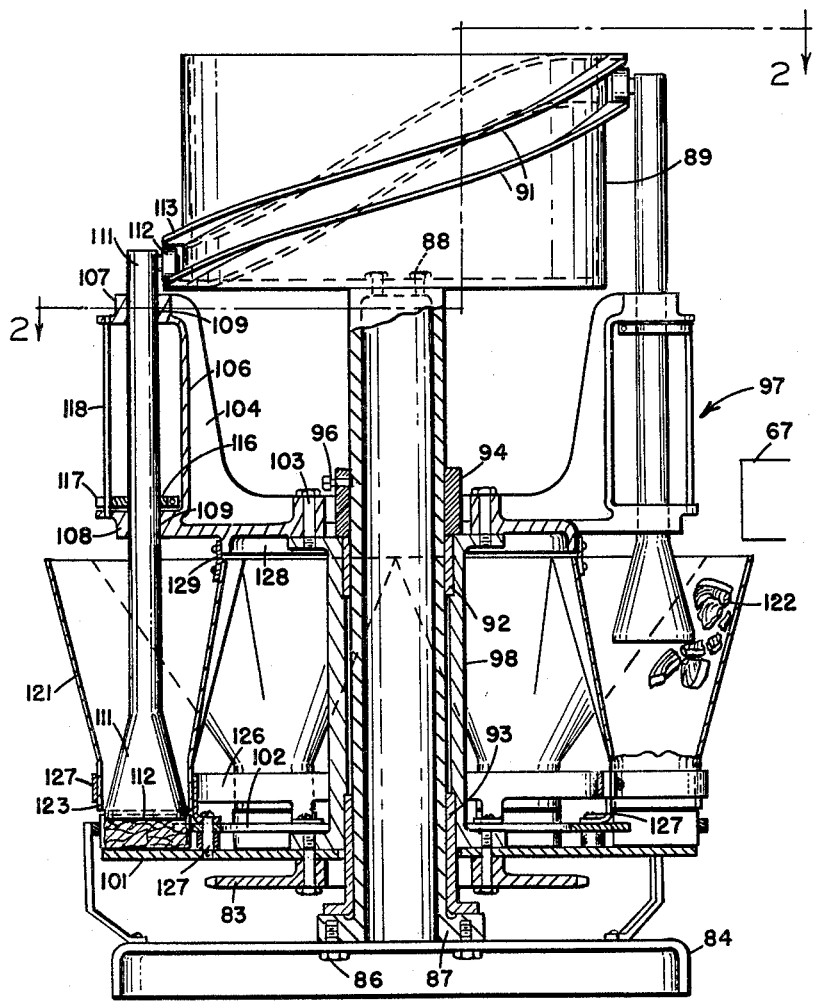

May 4, 1965 E. H. CARRUTHERS 3,181,957
TUNA PACKER

Filed Sept. 6, 1960 2 Sheets-Sheet 1

INVENTOR.
EBEN H. CARRUTHERS

BY

ATTORNEYS

INVENTOR.
EBEN H. CARRUTHERS
BY
ATTORNEYS

United States Patent Office 3,181,957
Patented May 4, 1965

3,181,957
TUNA PACKER
Eben H. Carruthers, Box 1332, Warrenton, Oreg.
Filed Sept. 6, 1960, Ser. No. 53,966
4 Claims. (Cl. 99—188)

This invention relates to machines for packing a predetermined weight of a bulk product into containers, in this case fish, and more particularly tuna fish. Reference is made to my prior Patents No. 2,601,093, issued June 17, 1952, entitled Method and Apparatus for Packaging a Predetermined Weight of Food Material; No. 2,669,378 issued February 16, 1954, entitled Machine for Packing a Predetermined Weight of Bulk Product; and No. 2,602,578, issued July 8, 1952, entitled Apparatus for Packing Materials.

In Patent No. 2,602,578, a machine is shown and described for packing what is known in the art as a "chunk" machine; that is, a machine for packing tuna fish in the so-called chunk-style pack. This machine is in successful operation in a large number of tuna canning plants in this and other countries and its operation has been very satisfactory. However, some canneries desire what may be termed a fancier pack of chunk-style tuna. In utilizing the machine of Patent No. 2,602,578, the tuna is first cut into chunks by a guillotine or other means and then conveyed to a rotatable basin which has scraper blades cooperating therewith to direct the chunks of tuna into a continuously presented series of measuring pockets for subsequent discharge into cans.

The scraper blades have a tendency to break up the chunks of tuna into sizes smaller than desired by some canners and, in fact some of the tuna is broken up into flakes. Moreover, the machine is provided with a cut-off knife for the purpose of obtaining volumertic control and, hence, weight control. This cut-off knife trims the upper face of the tuna so that the upper face of the cake or slug of tuna, when the can is opened, appears somewhat smooth instead of having the distinct chunky appearance with some canners desire. In addition, with the machine of Patent No. 2,602,578, it is much more difficult to control the put-in weight than, for example, with the machine as shown in Patent No. 2,669,378. Since tuna is an expensive fish, it is desirable to control the weight within relatively exact limits.

I have found that by employing a machine similar to that shown in Patent No. 2,669,378 and first producing a cake of solid pack tuna, then breaking up the cake by preferably natural forces such as dropping the cake onto a hard surface, it is possible to overcome the disadvantages of the machine of Patent No. 2,602,578 and provide a machine in which flaking of the tuna and as it appears in the can when opened is minimized; the chunky characteristics of the can of tuna is more clearly defined; and more accurate weight control can be obtained.

An object of my invention is to produce a more satisfactory chunk style pack.

Another object of my invention is to provide a method and means for producing a can of tuna which when opened presents the appearance of a cake of tuna in chunks, as distinguished from a smoothly cut surface in which the chunks are commingled with flakes.

A further object of my invention is to provide a machine for producing a so-called chunk style tuna wherein the weight of tuna is more accurately controlled.

My invention further contemplates the provision of a machine and method adapted to produce a more satisfactory chunk-style pack of tuna which, when the can is opened, presents a chunky appearance, reduced rating of the tuna and a more accurate control of the put-in weight.

Figures 2, 3:
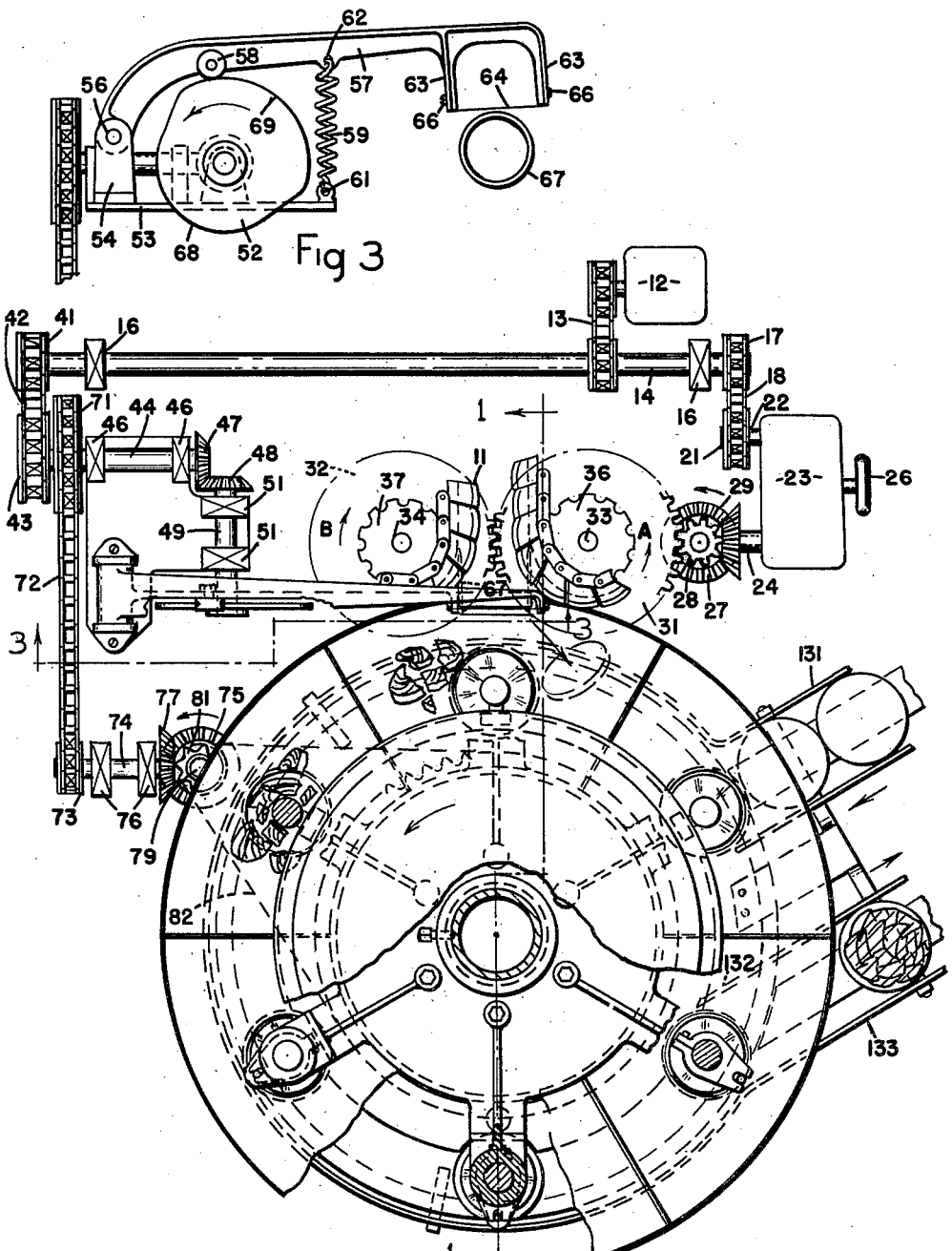

Other objects and advantages of my invention will be particularly set forth in the claims and will be apparent from the following description, when taken in connection with the accompanying drawings, in which:

FIG. 1 is a side elevation of a part of the machine of my invention taken substantially on the line 1—1 of FIG. 2 in the direction indicated by the arrows;

FIG. 2 is a sectional view taken substantially on the line 2—2 of FIG. 1 in the direction indicated by the arrows showing in addition somewhat schematically the discharge end, the machine of Patent No. 2,669,378, together with one way in which the various parts of the combined machines may be driven; and FIG. 3 is a view taken substantially on the line 3—3 of FIG. 2 in the direction indicated by the arrows.

Referring to FIG. 2, I have shown at 11 the end of the forming chains or movable forming tunnel of Carruthers Patent No. 2,669,378 by which loins of tuna are fed into one end of the machine and are gradually molded into substantially a cylinder of tuna of substantially constant weight per unit of length. The manner in which this is accomplished is fully described in said patent and need not be repeated herein. The forming chain assembly 11 is driven by means of an electric motor 12 or other prime mover 12 which drives a sprocket and chain assembly 13 which in turn drives a shaft 14.

The shaft 14 is provided with suitable bearings 16 and at one end thereof is provided with a sprocket 17 which drives a chain 18 which in turn drives a sprocket 21 mounted on the end of a shaft 22. The shaft 22 extends into a variable speed drive unit not necessary to be described herein since such units are well known in the art. The output of the variable speed drive extends to a shaft 24 having a bevel gear 25 rigidly mounted thereon. A hand wheel 26 is provided on the variable speed unit by which a variation in the speed of rotation of the shaft 24 may be made with relation to the speed of rotation of the shaft 22. Through this means, a very accurate adjustment may be made so as to vary the thickness of the cake or slug so as to vary the weight of tuna cut from the roll as described in Patent No. 2,669,378.

The bevel gear 25 drives a bevel gear 27 mounted on a shaft 28 which has a pinion 29 rigidly secured thereto. The pinion drives a gear 31, in the direction indicated by the arrow A. Gear 31 in turn drives a gear 32 in the direction indicated by the arrow B. The gears 31 and 32 are rigidly mounted respectively on shafts 33 and 34 which carry sprockets 36 and 37 driving molding chain assembly 11, as more clearly shown and described in Patent No. 2,669,378. A sprocket 41 is rigidly mounted on the other end of the shaft 14 which drives a chain 42 which in turn drives a sprocket 43 fixed to a shaft 44. The shaft 44 is mounted in bearings 46 and has fixed to its outer end a bevel gear 47 which drives a bevel gear 48 mounted on a shaft 49. The shaft 49 is carried by bearings 51 and has a cam 52 rigidly mounted thereon.

Referring now to FIG. 3, a support 53 is rigidly mounted on the frame of the machine which carries the molding chain assembly 11. The support 53 carries a bifurcated standard 54, the bifurcations of which extend upward and have a pivot pin 56 extending therethrough. An arm 57 is pivoted on the pivot pin 56 and carries a roller 58 which rides on the perimeter of the cam 52. A spring 59 has one end connected to the support, as indicated at 61, and the other end connected to the arm, as shown at 62. The arm 57 has a bifurcated end, as shown at 63, and a wire cutter or knife 64 is stretched across the opening in the bifurcated end 63. Suitable means, as indicated at 66, are provided for supporting and tensioning the wire 64. The end of the forming chains 11 feed into a throat 67 which is cylindrical in cross-section.

In the case of the regular ½ pound can of tuna, the slug of tuna should be approximately 1⅛ inches in height or thickness. However, to provide a chunk pack, the knife is timed with relation to the speed of advance of the roll of tuna so that it makes a downward cutting stroke to slice off a thin disc of tuna approximately 9/16 inch in height. Thereafter, there is a dwell 68 in the cam to allow time for the roll of tuna to be fed sufficiently so that another disc of tuna approximately 9/16 inch in height or thickness can be cut off the roll upon upward movement of the cutting wire. A similar dwell 69 allows time for the roll to be fed into the cutting position on the downward stroke of the wire cutter.

One of the important aspects of this invention, insofar as producing chunk tuna is concerned, is that the machine of Patent No. 2,669,378 provides a very fine adjustment to permit small variations in the weight of slugs or discs of tuna to be cut off the roll of tuna being fed. This fine adjustment is provided by the variable speed drive 23. While it would be possible to vary the speed of the wire cutter with relation to the speed of advance of the forming chains, the variable speed drive 23 accomplishes this in a simple and more efficient manner. In Carruthers Patent No. 2,669,378, a forming collar is provided externally of the throat and the knife passes through the space between the collar and the end of the throat. Such an arrangement could be provided in the machine of this invention. However, since the slices to be cut off are only approximately 9/16 inch in thickness, the collar can be omitted.

Mounted on the shaft 44 is a second sprocket 71 which drives a chain 72 which in turn drives a sprocket 73 rigidly mounted on a shaft 74. The shaft 74 is supported by bearings 76 and drives a bevel gear 77 rigid with the shaft 74. The bevel gear 77 drives a bevel gear 78 rigidly mounted on a shaft 79.

Referring now, in addition to FIG. 2, to FIG. 1, mounted on the shaft 79 is a sprocket 81 which through a chain 82, indicated in dotted lines, drives a sprocket 83. Sprocket 83 is rigid with respect to a rotating turret assembly as shown in FIG. 1. Mounted on a base 84, as shown at 86, is a rigid post 87 which has rigidly secured at its upper end, as indicated at 88, a cylindrival cam drum 89. The cam drum has a cam track 91 rigidly secured to its outer periphery, the purpose of which will later appear.

Mounted on the stationary support column are a pair of sleeve bearings 92 and 93, the upper one of which is held in position by a retaining collar 94, fixed in position by a set screw 96. The turret, generally indicated by the numeral 97, rotates on the sleeve bearings.

The turret 97 comprises a rotating turret post 98, the lower end of which is flanged to receive bolts 99 which extend through the sprocket 83, a can platform 101 and a can feeding disc 102. The upper end of the rotating turret post 98 is also flanged to receive bolts 103 which extend through a spider-like member 104.

The spider 104 has in this case six substantially vertically extending plunger guides 106. The plunger guides 106 have outwardly extending members 107 and 108 which have openings 109 for the reception of plungers 111. The lower end of each of the plungers is enlarged, as shown at 111 and has a flat face 112. The flat face 112, the diameter of which is just slightly less than the diameter of the cans or other containers to be packed with fish, fits into the cans. The flat faces 112 of the plungers constitute a tamping means for tamping the pieces of tuna into the cans. The upper ends of each of the plungers is provided with a stub shaft 115 adapted to receive a roller 113 which rides in the cam track 91. For the purpose of holding the plungers so that the stub shafts 115 are radial with respect to the axis of the machine, a guide fitting 116 is secured rigidly to each of the plungers. Each of the guide fittings 116 has a bifurcated end 117 adapted to straddle a guide rod 118 fixed to the plunger guide members 107 and 108.

It will now be apparent that as the plungers reciprocate the guide rods prevent the plungers from rotating about their axes. The plungers reciprocate in, in this case, six funnel shaped members 121 which are adapted to receive chunk tuna, indicated by the numeral 122, as it is dropped after being cut by the wire cutter. This has been diagrammatically illustrated in FIG. 1. It will be appreciated that as the tuna slice or disc is dropped, gravity tends to break up the disc. Moreover, the discs strike the side walls of the funnels and plungers before dropping into the cans, which action also assists breaking the tuna into chunks.

The lower ends of the funnels each have a cylindrical part 123, the inner diameter of which is about the same as the diameter of the cans. As the tuna falls through the cylindrical part 123, it is partially formed into a disc of pieces. The final rounding of the disc or slug is completed in the can when the plunger comes down on the tuna in the can.

A clamping ring 126 is fixed to the can feeding plate, as indicated at 127', and has six circular members or clamps 127 which encircle the lower ends of the funnels and are secured thereto in any suitable manner. The lower end of the spider 104 is provided with a flange 128 adapted to receive a plurality of brackets 129 which are tied to the flange and tied to the funnels, as shown in the drawings, the purpose being to hold the funnels rigid in the rotating turret assembly.

Cans are brought to the turret by means of a descending can chute 131. Thus, the cans are fed by gravity into can pockets 130 formed on the can drive plate or feeding disc 102. The cans are picked off or out of the pockets by a bar 132 which may constitute part of a filled can discharge chute 133. Can-feed and can-discharge chutes for machines of this type are well known in the art to which this invention applies and need not be further described.

It is believed the operation of the machine will be apparent from the foregoing. The loins of tuna are formed into a roll of tuna and slices or discs of tuna are cut off, two discs in this instance being a charge for one can. The combined weight of these two discs can be accurately controlled by the variable speed drive, above described. As the discs of tuna drop by gravity and strike any surface they are broken up into chunks or pieces of substantial size which are formed primarily in the cans into a slug. Flaking of the tuna is greatly minimized and the can when opened presents a chunky attractive appearance.

While I have shown and described the preferred form of mechanism of my invention it will be apparent that various modifications and changes may be made therein, particularly in the form and relation of parts, without departing from the spirit of my invention as set forth in the appended claims.

I claim:

1. A machine for packing fish into containers comprising, in combination, means for forming loins of fish into a roll of tuna of constant weight per unit of length, means for advancing the formed roll of tuna to a cut off position, cutting means having a reciprocating cutting motion and means for actuating said cutting means at a speed with relation to the speed of advance of the roll that the cut off means cuts off a slice of the roll upon the actuation of the cut off means in each direction.

2. A machine in accordance with claim 1 in which two slices of tuna are placed in each container.

3. A method of packing fish into containers which comprises forming loins of fish into solid pack cakes of fish of a diameter, thickness and weight desired to be placed in a single container, breaking up the solid pack cake of tuna fish into pieces of tuna fish and reforming the so-measured quantity of pieces into a chunk pack cake of fish into a single container by pressure only, thus retaining their chunk appearance.

4. A machine for producing chunk pack tuna packed in containers which comprises means for forming loins of tuna into a roll of tuna of constant weight per unit of length, means for continuously advancing said roll of tuna to a cut off position, cutting means, means for actuating said cutting means to cut off slices of constant weight, means for varying the speed of actuation of said cutting means with relation to the speed of advance of the roll of tuna to vary the weight of the slices, means for breaking up the slices into pieces, means for packing the pieces in containers including a rotatable turret carrying a plurality of funnels rotatable beneath said cut off position to successively receive the pieces, the containers being carried by the turret beneath said funnels and tamping means for tamping the pieces in the containers after they are in the containers.

References Cited by the Examiner
UNITED STATES PATENTS

| | | | |
|---|---|---|---|
| 2,601,093 | 6/52 | Carruthers | 99—188 |
| 2,630,390 | 3/53 | Carruthers | 99—188 |
| 2,669,378 | 2/54 | Carruthers | 141—80 |

A. LOUIS MONACELL, *Primary Examiner.*

ABRAHAM H. WINKELSTEIN, *Examiner.*